Figure 3:
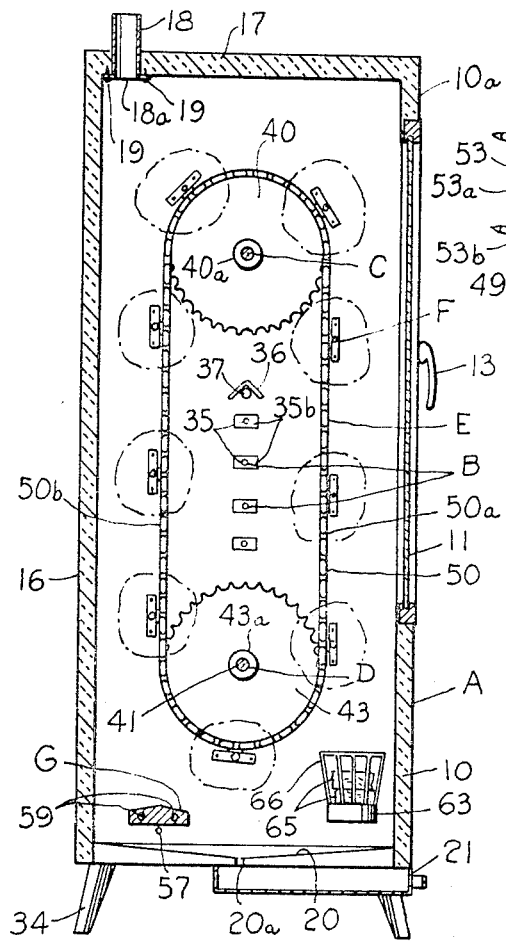

Sept. 20, 1966 R. G. WILSON 3,273,489
ELECTRIC OVEN
Filed Oct. 18, 1963 3 Sheets-Sheet 1
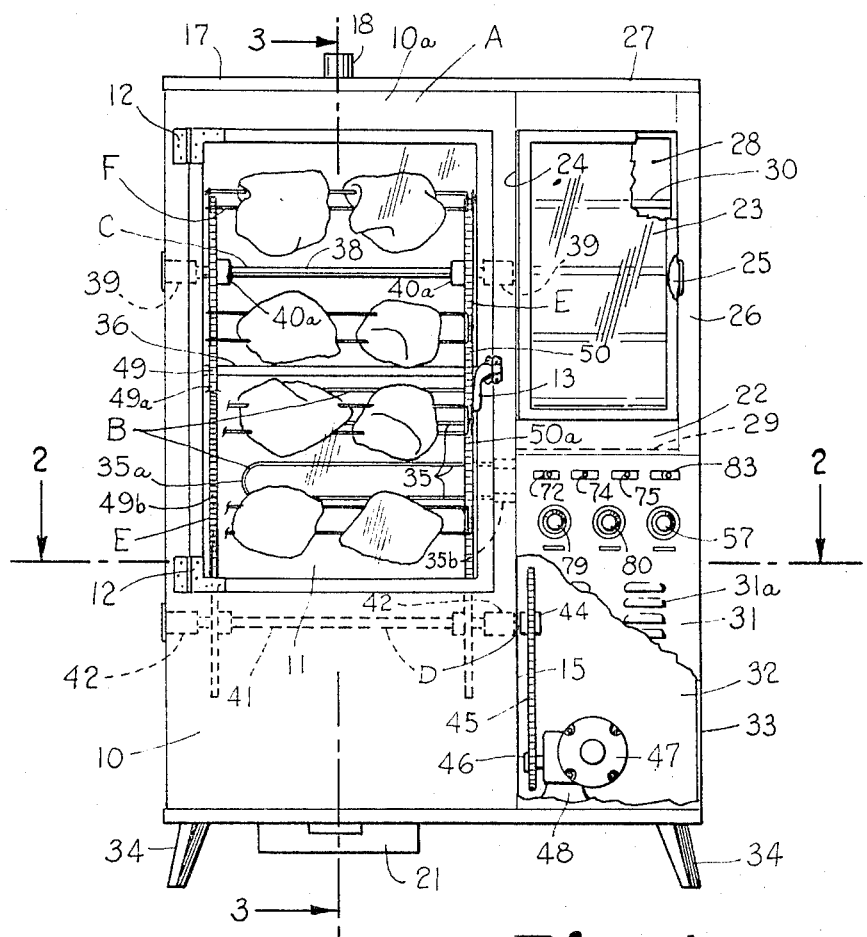
Fig. 1.
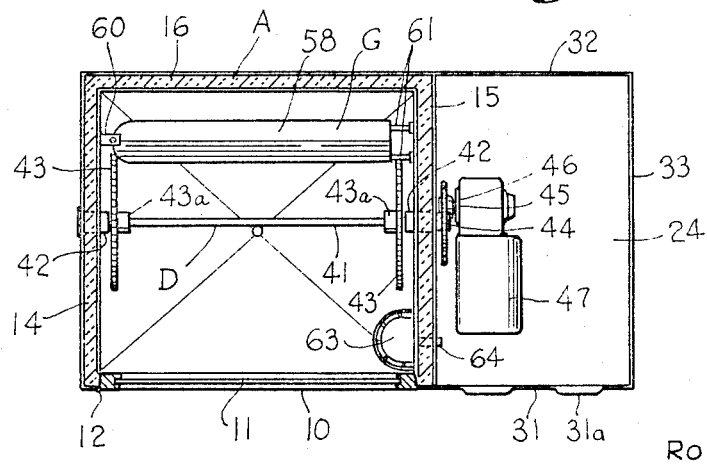
Fig. 2.
INVENTOR.
ROBERT G. WILSON
BY 
ATTORNEY Sept. 20, 1966  R. G. WILSON  3,273,489
ELECTRIC OVEN Filed Oct. 18, 1963  3 Sheets-Sheet 2

INVENTOR.
ROBERT G. WILSON
BY
ATTORNEY

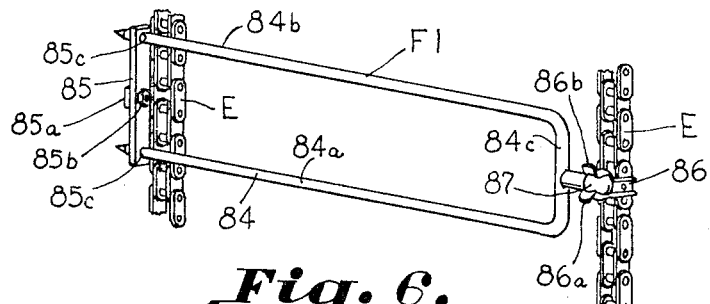
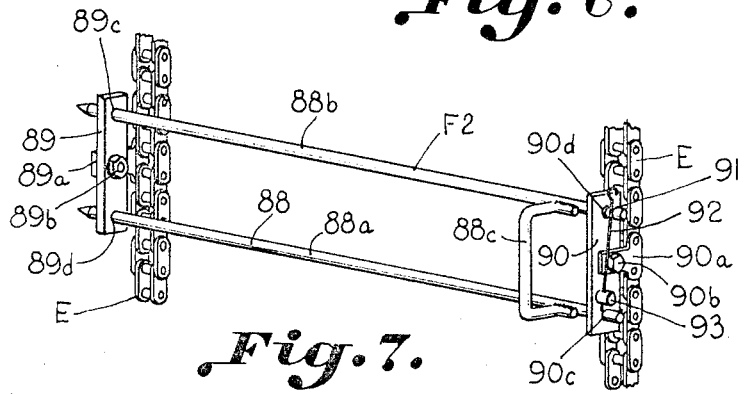
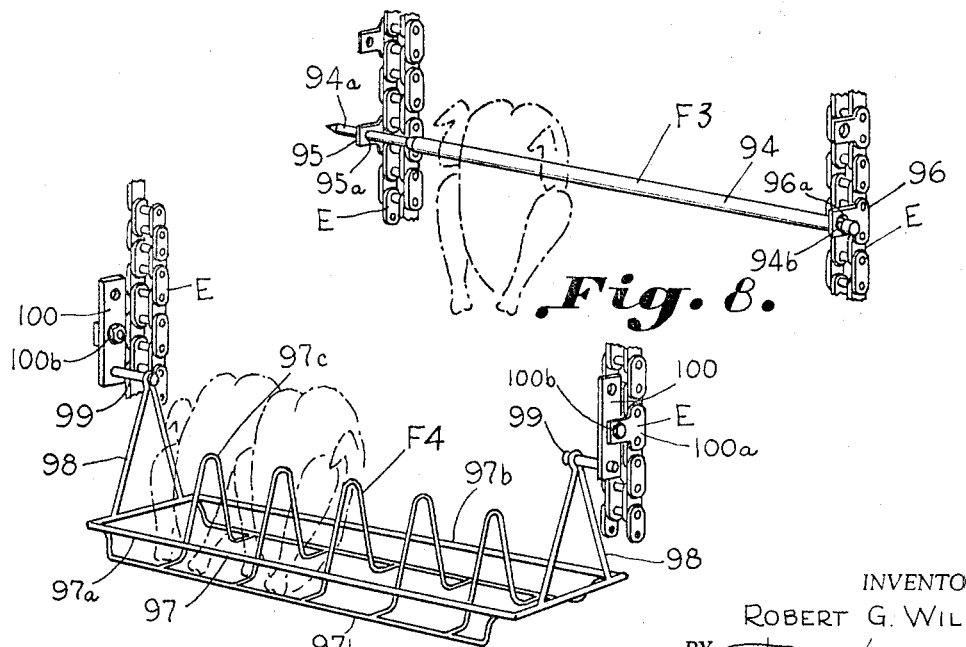

3,273,489
ELECTRIC OVEN
Robert G. Wilson, 643 E. Faris Road, Greenville, S.C.
Filed Oct. 18, 1963, Ser. No. 317,316
9 Claims. (Cl. 99—421)

This invention relates to electric ovens which are especially useful in barbecuing meat.

It has been found that real barbecue flavor in meat is achieved in part from the smoke caused by grease drippings from the meat falling onto live coals below. While barbecued meat of excellent quality and flavor has been made readily available through the use of machines such as those illustrated in United States Patent No. 2,722,882 issued May 3, 1955, to the present inventor, no provision has been made to supply the flavor component referred to above. It has also been found that it is desirable in some cuts of meat, such as pork shoulder cuts having extensive fatty portions, to continuously subject certain portions thereof to direct exposure to the heating means for extended periods of time. The subject matter of this invention makes it possible to cook out excessively fatty portions of the meat by subjecting them to direct heat while subjecting the meat to a self-basting action through continued movement of the meat to avoid excessive meat shrinkage. Further, it has been found that certain other meat items, such as chickens, should be subjected alternately on both sides to continued direct exposure to the heating means for limited periods of time in order to brown evenly to a desirable color. The subject matter of this invention makes it possible to brown evenly as desired, while subjecting the meat to a self-basting action.

Accordingly, it is an object of this invention to provide an electric oven capable of providing barbecued meat of improved flavor through the use of smoke from grease drippings produced in a controlled manner, and yet provide an oven which is easily cleaned.

An important object of the invention is to provide an apparatus for cooking meat in which selected portions of the meat are continuously subjected to direct exposure to the heating means while subjecting the meat to a self-basting action through continued movement of the meat.

Another important object of the invention is to provide an apparatus for cooking meat in which the meat is subjected alternately on both side to continued direct exposure to the heating means for limited periods of time while subjecting the meat to a self-basting action to accomplish even browning and avoid meat shrinkage.

Another important object of the invention is to provide an open tray construction avoiding the necessity of impaling meat upon spits and the like.

It is a further object of this invention to provide an electric oven having the above advantages in which the meat is readily accessible and easily positioned and removed and attractively displayed during cooking.

Yet another object of the invention is to conserve space necessary to carry out a given cooking operation through the provision of a substantially vertical path of travel for the edibles to be cooked. Thus, it is possible to cook a relatively large quantity of meat utilizing relatively little floor space.

The construction designed to carry out the invention will be hereinafter described, together with other features thereof.

Figure 4:
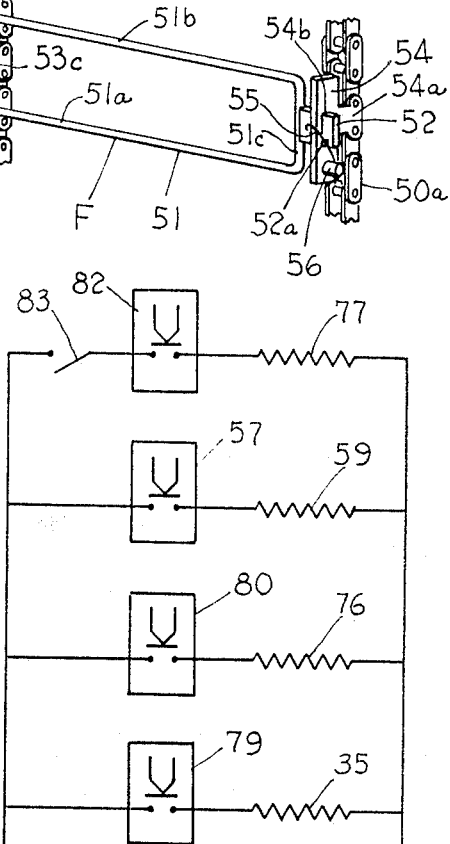
Figure 5:
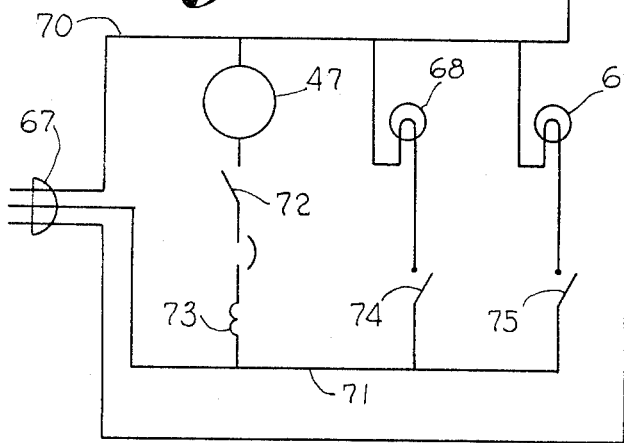

The invention will be more readily understood from a reading of the following specification and by reference to the accompanying drawings forming a part thereof, wherein an example of the invention is shown and wherein:

FIGURE 1 is a front elevation illustrating the method and apparatus in accordance with the present invention, FIGURE 2 is a sectional plan view taken on the line 2—2 in FIGURE 1, FIGURE 3 is a transverse sectional view taken on the line 3—3 in FIGURE 1, FIGURE 4 is an enlarged perspective view illustrating a meat holding means in accordance with the invention, FIGURE 5 is a schematic circuit diagram illustrating the various electrical components of the embodiment of the invention illustrated, FIGURE 6 is a perspective view illustrating a meat holding means in accordance with a modified form of the invention, FIGURE 7 is a perspective view illustrating a meat holding means in accordance with another modified form of the invention, FIGURE 8 is a perspective view illustrating a meat holding means in accordance with another modified form of the invention, and FIGURE 9 is a perspective view illustrating a meat holding means in accordance with still another modified form of the invention.

The drawings illustrate an oven A. Vertically disposed electrical heating means B are positioned within an intermediate portion of the oven. A first horizontal shaft C is carried for rotation within the oven above the electrical heating means. A second horizontal shaft D is driven and mounted for rotation within the oven below the electrical heating means. A pair of spaced chains E are carried by the shafts so that each chain passes around the electrical heating means defining opposed vertical linear runs of chain. Meat supporting means F are carried on each end thereof upon one of the chains. An electrically heated means G, controlled by a thermostat, is disposed so as to receive drippings from the meat thereon, causing them to smoke and thus flavor the meat. It will be noted that both double and single prong spits are illustrated, as well as a pivoted tray. Heated means are also provided for causing flavoring means such as hickory wood to smoke. It will be observed that a selected portion of the meat may be continuously directly subjected to the heating means for an extended period of time or the meat may be subjected continuously directly to the heat on both sides for short intervals.

The oven A generally takes the form of an insulated enclosure having a lower front wall portion 10 and an upper front wall portion 10a for carrying a glass door 11 therebetween. The glass door 11 is provided with hinges 12 on one side thereof and with a fastening means operated by the handle 13 on the other side thereof. The oven A further includes insulated side walls 14 and 15 and a rear wall 16. The oven has an insulated top 17 provided with a vent 18 which may or may not be closed by the cover 18a. The cover 18a has suitable fastening means in the form of screws 19. The oven has a bottom portion 20 sloping toward a central opening 20a for collecting grease to flow into a tray 21. The various insulated walls described above are preferably formed of sheet metal portions with a layer of Fiberglas or other suitable insulation therebetween.

A warmer oven is illustrated in the drawing as being carried on one side of the oven A. The warmer oven includes a front wall 22 carrying a glass door 23 therein. The glass door 23 is hinged as at 24 to the oven wall 15 on one side thereof, and is provided with a suitable fastening means 25 on the other side thereof. Thus, the fastening means 25 is attached to the warmer side wall 26 opposite the wall 15 which serves as a joint side wall for the oven A and the warmer. The warmer has a top portion 27 which is an extension of the upper wall 16. A rear wall 28 is provided for the oven as well as a suitable floor partition 29. The warmer has suitable removable trays 30 for carrying the meat which has been cooked within the oven A.

A compartment is formed below the warmer oven by the wall 15 and front and rear walls 31 and 32 together with a side wall 33 and a suitable base 24. The front compartment wall 31 is vented as at 31a to accommodate a motor driving means for operating the meat supporting elements carried within the oven A as will be described in greater detail below. The entire cabinet is carried by suitable legs 34. The compartment also houses much of the electrical circuitry which will be described below and serves as a panel for mounting the various control elements for the components of the electrical circuit.

Vertically disposed electrical heating means B are provided in the form of vertically spaced heating elements 35. The heating elements 35 are preferably in the form of Calrod heating elements joined together on one end as at 35a, the opposite end being carried within the wall 15 as at 35b. The heating elements 35 are provided with a cover 36 which is carried within a bar support 37 carried between the oven walls 14 and 15. Suitable support means 37 are carried by the walls 14 and 15, and the cover 36 in the form of a triangular sheet metal portion prevents grease from dripping upon the heating elements 35.

The chain mounting means C includes a first horizontal shaft 38 which is carried for rotation within the oven above the electrical heating means. The shaft 38 is mounted for rotation within the walls 14 and 15 in suitable bearings 39 and carries a sprocket 40 having hubs 40a which are fixed thereto. Second chain carrying means D includes a shaft 41 carried within suitable bearings 42 between the walls 14 and 15 within suitable bearings 42. Sprockets 43 having hubs 43a are fixed upon the shaft 41. The shaft 41 extends through the wall 15 and carries a third sprocket 44 within the compartment below the warmer (FIGURE 1). The sprocket 44 is driven by a chain 45 which is driven by the sprocket 46 carried by the power take-off of an electric motor 47, which has suitable mounting as at 48 within the vented compartment. Means for conveying the meat E includes a pair of spaced chains 49 and 50 carried between the sprockets 40 and 43, respectively. The chain 49 has a front vertical run 49a and a rear vertical run 49b (FIGURE 1). Likewise, the chain 50 has a front vertical run 50a, and a rear vertical run 50b (FIGURE 3). It will be noted that the chains 49 and 50 pass under the sprockets 43 and over the sprockets 40.

Meat supporting means F are carried on each end thereof upon the chains 49 and 50 and in the embodiment illustrated in FIGURES 1, 3 and 4 include double pronged spits 51. The prongs 51a and 51b are joined on one end as at 51c. The bridge portion 51c carries a substantially rectangular stub portion 52. A pair of bracket members 53 and 54 are illustrated as being carried between the chains 49 and 50. The brackets 53 and 54 have standard portions 53a and 54a which have fixed connection to opposite chain links so that the spits will present no problem when passing over the sprockets 40 and under the sprockets 43. Were the prongs 51a and 51b fastened directly to the links, they would be pressed together due to the shortened distance between links resulting from their arcuate movement around the sprockets. The bracket 53 has apertures 53b therein for receiving the prongs 51a and 51b. The bracket 53 is pivotally carried by the standard 53a as at 53c. An aperture 54b is provided for receiving the shank 52. The shank 52 has a notched portion 52a for receiving a spring member 55 carried by a post 56 which has fixed connection with the bracket 54.

The electrically heated means G are controlled by a thermostat 57. The electrically heated means G further comprises an elongated member 58 which has a sufficiently large surface disposed on one side of the oven for receiving drippings from the meat during its course of being carried on the rear runs 49b and 50b of the chains 49 and 50. The plate 58 carries heating elements 59 therein (FIGURE 3). The plate 58 is fixed on one end thereof above the base 20 to the side wall 14 by a suitable bracket and fastening means 60. The plate 58 is supported by conduits 61 carried by the opposite oven wall 15. A second heating element 63 is carried by a conduit 64 within the oven on the opposite side of the plate 58 by the wall 15. The heating element 63 is provided for the purpose of slowly burning hickory chips 65 placed thereupon. A vertical grate 66 is provided for receiving hickory chips in a stack so that as they burn down, fresh hickory wood will be supplied.

FIGURE 5 illustrates a schematic circuit diagram of the various electrical components employed in connection with the structure described above. The plug 67 is suitable for use with a 220-volt single phase supply (not shown). The motor 47, an oven light 68 and a warmer light 69 are connected across the lines 70 and 71 supplying 110 volts. It will be noted that the motor 47 is provided with a switch 72 and a circuit breaker 73 in series therewith across the lines 70 and 71. The oven light 68 is provided with a switch 74 and the warmer light 69 is provided with a switch 75. The oven heating elements 35, the heating elements for the warmer 76, the heating elements for the grease smoker G designated at 59, and the heating elements for the hickory smoker 77, are connected across a 220-volt supply by connection across the lines 70 and 78. In series with the oven heating elements 35 is a thermostat 79 which has a manually adjustable control provided therefor. A similar thermostat 80 is in series with the warmer heating elements 76. A similar thermostat 57 is in series with the grease smoker heating elements 59, and a thermostat 82 is in series with the hickory smoker heating elements 77 together with a switch 83. The adjustable thermostat 57 is desirable because the temperature must be such that the grease will smoke but not burn with excessive flame. The thermostat 82 is desirable to prevent the hickory wood from burning with excessive flame. In view of the fact that some meat, pork for example, absorbs smoke flavor easier than other meat, chicken for example, make controls for the grease smoker G and the hickory smoker 63 especially desirable.

FIGURE 6 illustrates a modified form of the invention in which the meat supporting means F1 comprises a double prong spit 84 having prongs 84a and 84b is held between a pair of bracket members 85 and 86. The prongs 84a and 84b are joined as at 84c and a ball-like projection 87 is fixedly carried thereby and confined between a pair of spring clip members 86a and 86b. The bracket 85 is carried upon a standard 85a and is pivotally mounted thereon as at 85b. The bracket 85 has a pair of apertures 85c to accommodate the prongs 84a and 84b.

FIGURE 7 illustrates another modified form of the invention in which the meat supporting means F2 comprises a double prong spit 88 having prongs 88a and 88b. The spit 88 is mounted between a pair of bracket members 89 and 90. The bracket 89 is carried upon a standard 89a and is pivotally mounted thereon as at 89b. The bracket 90 is carried upon a standard 90a and is pivoted thereon as at 90b. The prongs 88a and 88b are joined adjacent one end thereof by a handle 88c and the adjacent end thereof extends within apertures 90c and 90d within the bracket 90. One of the free ends has a notch 91 therein to accommodate a spring member 92 fixedly carried by the post 93 upon the bracket 90. Openings 89c and 89d are provided for accommodating the opposite ends of the prongs 88a and 88b. If desired, a single prong spit could readily be used in this bracket arrangement.

FIGURE 8 shows still another modified form of the invention in which the meat carrying means F3 includes a single prong spit 94 which is carried by the chains E adjacent each end thereof by brackets 95 and 96. The bracket 95 has an aperture 95a therein for accommodating a reduced portion 94a of the spit 94. The spit 94 has a groove 94b therein which is accommodated within an aperture 96a within the bracket 96. It will be noted that the meat is impaled upon the spit 94 above its center of gravity so that opposite sides of the meat are exposed to direct heat from the heating elements B on each vertical run of the chains E.

FIGURE 9 illustrates another modified form of the invention in which the meat supporting means F4 includes a tray like arrangement 97 which has supports 98 adjacent each end thereof, which are pivotally carried by inwardly projecting members 99 between a pair of brackets 100. The brackets 100 are illustrated as being similar to those illustrated in the modification of FIGURE 7. The brackets 100 are carried by standards 100a which pivotally carry the brackets 100 as at 100b. The tray or basket arrangement 97 includes a substantially rectangular frame 97a and a pair of depending longitudinal side frame members 97b. A plurality of substantially vertical transverse members 97c which are adapted to fit within the body cavity of a chicken are fixed to the depending side frame members 97b. Thus, the tray may be easily and inexpensively constructed of relatively stiff wire-like members. The vertical members 97c may be inserted into the body cavity of the chicken so as to support a chicken placed thereon allowing the juices to fall from the open tray. It will be noted that any inconvenience which would arise due to the necessity of impaling the meat upon spits is avoided. Many other cuts of meat may be readily positioned in this manner. Spare ribs, for example, may be placed longitudinally on both sides of the vertical members 97c and held between such vertical members and the frame 97a. It will also be observed that the temperature of the oven may be turned down, and if desired, movement of the meat supports stopped after cooking. Then the oven could serve as a warmer and meat served directly from the oven to enhance sales appeal.

It will be observed in FIGURES 1, 2, 3, 4, 6 and 7 that it is possible to cook meat with a single side thereof, continuously directly facing the heating means. The double pronged spits maintain the meat with the single side continuously projecting inwardly of the chains E. The meat first passes along a vertical run of the chains, around a sprocket wheel and along another vertical run of chain prior to returning to the first mentioned run of chain. Thus, a selected portion is continuously subjected to the direct heat of the heating means. With reference to FIGURES 8 and 9, it will be observed that it is possible to cook meat with each side of the meat alternately directly facing the heating means. One side of the meat faces the heating means during a vertical run of the chains, then the meat passes around a sprocket with one end facing the heat, then the meat passes along another run of the chains with the other side of the meat continuously facing the heat, and around the other sprocket wheel with the other end of the meat facing the heat prior to returning to the first mentioned position.

It is thus seen that true barbecue flavor may be achieved in an electric machine which is easily cleaned. The meat is most attractively displayed during cooking due to movement thereof which results in self-basting. The versatility of the machine makes it possible to cook meat according to a method which results in even browning or the concentration of heat upon a selected portion of the meat. Not only is the true barbecue flavor provided, but also excessive shrinkage is avoided, resulting in juicy tender meat.

While a preferred embodiment of the invention has been described using specific terms, such description is for illustrative purposes only, and it is to be understood that changes and variations may be made without departing from the spirit or scope of the following claims.

What is claimed is:

1. For use in an oven enclosure, the combination including, stationary vertically disposed electrical heating means disposed substantially within the central portion of the oven enclosure, a first horizontal shaft within the oven enclosure disposed above and in substantial alignment with the electrical heating means, a second horizontal shaft within the oven enclosure disposed below and in substantial alignment with the electrical heating means, sprockets adjacent the ends of each shaft whereby each of the sprockets on the upper shaft is substantially aligned with a sprocket on the lower shaft, a pair of horizontally spaced vertically disposed continuous chains carried by respective pairs of aligned sprockets so that a vertical run of each of the chains passes on each side of the electrical heating means, power operated driving means for turning said shafts continuously, a plurality of substantially horizontally disposed meat supporting means each comprising a single prong spit, said supporting means being subjected to the direct application of heat from said electrical heating means on each vertical run of the chains, spaced pairs of opposed brackets having fixed connection with opposed chain links, and means positioning the spits for rotation within the brackets, said spits being freely rotatable in said brackets whereby the weight of the meat will be the sole source for rotating the spits as they pass from one side of the vertical heating means to the other side thereof.

2. For use in an oven enclosure, the combination including, stationary vertically disposed electrical heating means disposed substantially within the central portion of the oven enclosure, a first horizontal shaft within the oven enclosure disposed above and in substantial alignment with the electrical heating means, a second horizontal shaft within the oven enclosure disposed below and in substantial alignment with the electrical heating means, sprockets adjacent the ends of each shaft whereby each of the sprockets on the upper shaft is substantially aligned with a sprocket on the lower shaft, a pair of horizontally spaced vertically disposed continuous chains carried by respective pairs of aligned sprockets so that a vertical run of each of the chains passes on each side of the electrical heating means, power operated driving means for turning said shafts continuously, a plurality of substantially horizontally disposed meat supporting means each comprising a tray having respective end portions rotatably connected with each of the chains, each tray having an open bottom, a plurality of horizontally spaced upward projections on each tray for positioning meat thereon, said projections tapering upwardly to a point and extending a substantial distance above the side portions to facilitate the placing and removal of meat thereon, said end portions extending upwardly a substantial distance above the height of said projections and forming an opening to receive bearing means disposed on pairs of opposed segments of the respective chains, and said supporting means being subjected to the direct application of heat from said electricatl heating means on each vertical run of the chains.

3. For use in an oven enclosure, the combination including, stationary vertically disposed electrical heating means disposed substantially within the central portion of the oven enclosure, a first horizontal shaft within the oven enclosure disposed above and in substantial alignment with the electrical heating means, a second horizontal shaft within the oven enclosure disposed below and in substantial alignment with the electrical heating means, sprockets adjacent the ends of each shaft whereby each of the sprockets on the upper shaft is substantially aligned with a sprocket on the lower shaft, a pair of horizontally spaced vertically disposed continuous chains carried by respective pairs of aligned sprockets so that a vertical run of each of the chains passes on each side of the electrical heating means, power operated driving means for turning said shafts continuously, a plurality of substantially horizontally disposed meat supporting means having respective end portions connected with each of the chains, said supporting means being subjected to the direct application of heat from said electrical heating means on each vertical run of the chains, means on said chains cooperating with said meat supporting means positioning same for linear movement on each vertical run of the chains so that one side of said meat continuously faces said electrical heating means on a vertical run of the chains, a shield positioned within the oven enclosure above and in vertical alignment with said stationary vertically disposed electrical heating means for avoiding the falling of meat drippings upon the heating means during cooking, an electrical heating element in said oven for carrying a flavoring medium causing said flavoring medium to smoke without excessive flame, a self-contained electrical heating element carried within the oven beneath said meat to receive grease drippings from the meat thereon, and means controlling the temperature of said electrical heating element to maintain the temperature sufficiently elevated to cause the drippings to smoke without excessive flame.

4. For use in an oven enclosure, the combination including, stationary vertically disposed electrical heating means disposed substantially within the central portion of the oven, a first horizontal shaft within the oven enclosure disposed above and in substantial alignment with the electrical heating means, a second horizontal shaft within the oven disposed below and in substantial alignment with the electrical heating means, sprockets adjacent the ends of each shaft whereby each of the sprockets on the upper shaft is substantially aligned with a sprocket on the lower shaft, a pair of horizontally spaced vertically disposed continuous chains carried by respective pairs of aligned sprockets so that a vertical run of the chains passes on each side of the electrical heating means, power operated driving means for turning said shafts continuously, a plurality of substantially horizontally disposed meat supporting means having respective end portions connected to said chains, said supporting means being subjected to the direct application of heat from said electrical heating means on each vertical run of the chains, and means on said chains cooperating with said meat supporting means positioning same for linear non-rotating movement on each vertical run of the chains so that the same side of said meat continuously faces said electrical heating means on both vertical runs of the chains.

5. The structure set forth in claim 4 in which the meat supporting means is a spit having a plurality of prongs and a shank portion including, a pair of opposed brackets having fixed connection with opposed chain links, means carried by one of said brackets receiving the shank portion of the spit, and means carried by the other bracket receiving the prongs of the spit.

6. The structure set forth in claim 5 in which the shank is rectangular in cross section, and in which the means receiving the shank portion includes, a rectangular aperture in the bracket, and resilient means received by the shank confining the shank within the bracket.

7. The structure set forth in claim 5 in which the means receiving the shank portion is a resilient clamp gripping the shank portion.

8. The structure set forth in claim 5 in which the shank portion includes a plurality of projections, and in which the means receiving the shank portion includes, a plurality of apertures, and resilient means received by a projection confining the shank portion within the bracket.

9. The structure as set forth in claim 4 and further including a self-contained electrical heating element carried within the oven beneath said meat to receive grease drippings from the meat thereon, and means controlling the temperature of said electrical heating element to maintain the temperature sufficiently elevated to cause the drippings to smoke without excessive flame.

References Cited by the Examiner

UNITED STATES PATENTS

| | | | |
|---|---|---|---|
| 1,618,587 | 2/1927 | Grady | 99—427 |
| 1,638,452 | 8/1927 | Panajiotaros et al. | 99—421 X |
| 1,771,762 | 7/1930 | Allwine | 99—427 |
| 1,934,904 | 11/1933 | Barnett et al. | |
| 2,264,611 | 12/1941 | Bemis. | |
| 2,533,080 | 12/1950 | Alexander. | |
| 2,549,019 | 4/1951 | Saunders | 99—421 |
| 2,722,882 | 11/1955 | Wilson | 99—421 |
| 2,739,715 | 3/1956 | Planeta | 220—19 X |
| 2,819,858 | 1/1958 | Mittendorf | 24—257 X |
| 2,905,077 | 9/1959 | Del Francia | 99—446 |
| 3,095,495 | 6/1963 | Gvozojak et al. | 99—447 X |
| 3,146,693 | 9/1964 | Di Pietro | 99—446 |
| 3,166,006 | 1/1965 | Lennox | 99—447 X |

FOREIGN PATENTS

| | | |
|---|---|---|
| 584,803 | 10/1959 | Canada. |
| 679,739 | 1/1930 | France. |

WALTER A. SCHEEL, *Primary Examiner.*

BILLY J. WILHITE, *Examiner.*